US012482864B2

(12) United States Patent
Kasamatsu et al.

(10) Patent No.: US 12,482,864 B2
(45) Date of Patent: Nov. 25, 2025

(54) NONAQUEOUS ELECTROLYTE SECONDARY BATTERY AND METHOD FOR MANUFACTURING NONAQUEOUS ELECTROLYTE SECONDARY BATTERIES

(71) Applicant: SANYO Electric Co., Ltd., Daito (JP)

(72) Inventors: Shinji Kasamatsu, Tokushima (JP); Yuta Ichikawa, Osaka (JP)

(73) Assignee: PANASONIC ENERGY CO., LTD., Osaka (JP)

(*) Notice: Subject to any disclaimer, the term of this patent is extended or adjusted under 35 U.S.C. 154(b) by 1358 days.

(21) Appl. No.: 16/979,650

(22) PCT Filed: Feb. 13, 2019

(86) PCT No.: PCT/JP2019/005074
§ 371 (c)(1),
(2) Date: Sep. 10, 2020

(87) PCT Pub. No.: WO2019/181286
PCT Pub. Date: Sep. 26, 2019

(65) Prior Publication Data
US 2021/0376390 A1 Dec. 2, 2021

(30) Foreign Application Priority Data
Mar. 20, 2018 (JP) .................. 2018-052659

(51) Int. Cl.
H01M 10/0587 (2010.01)
H01M 10/0525 (2010.01)
(Continued)

(52) U.S. Cl.
CPC ... *H01M 10/0587* (2013.01); *H01M 10/0525* (2013.01); *H01M 50/409* (2021.01);
(Continued)

(58) Field of Classification Search
CPC ................. H01M 10/0525; H01M 10/0587
See application file for complete search history.

(56) References Cited

U.S. PATENT DOCUMENTS

2001/0004502 A1* 6/2001 Nakamizo ........... H01M 50/414
429/231.1
2001/0009736 A1 7/2001 Shiota et al.
(Continued)

FOREIGN PATENT DOCUMENTS

CN 103947009 A 7/2014
CN 105720296 A 6/2016
(Continued)

OTHER PUBLICATIONS

International Search Report dated Apr. 23, 2019, issued in counterpart International Application No. PCT/JP2019/005074. (2 pages).
(Continued)

*Primary Examiner* — Matthew T Martin
*Assistant Examiner* — Ankith R Sripathi
(74) *Attorney, Agent, or Firm* — WHDA, LLP

(57) ABSTRACT

An object of the present disclosure is to provide a nonaqueous electrolyte secondary battery resistant to the occurrence of electrode plate deformation which can cause an internal short circuit. A nonaqueous electrolyte secondary battery according to an example embodiment of the present disclosure includes a wound electrode assembly including a positive electrode, a negative electrode and a separator, and a nonaqueous electrolyte. The separator is bonded to the positive electrode over a region from the end of the positive electrode on the coiling start side to a length corresponding to at least one loop in the winding direction.

1 Claim, 3 Drawing Sheets

(51) Int. Cl.
*H01M 50/409* (2021.01)
*H01M 50/417* (2021.01)
*H01M 50/426* (2021.01)
*H01M 50/443* (2021.01)
*H01M 50/446* (2021.01)
*H01M 50/449* (2021.01)
*H01M 50/46* (2021.01)
*H01M 50/491* (2021.01)
*H01M 50/531* (2021.01)

(52) U.S. Cl.
CPC ....... *H01M 50/417* (2021.01); *H01M 50/426* (2021.01); *H01M 50/443* (2021.01); *H01M 50/446* (2021.01); *H01M 50/449* (2021.01); *H01M 50/46* (2021.01); *H01M 50/491* (2021.01); *H01M 50/531* (2021.01)

(56) References Cited

U.S. PATENT DOCUMENTS

| | | | | |
|---|---|---|---|---|
| 2009/0234032 | A1* | 9/2009 | Kimishima | H01M 50/414 521/27 |
| 2013/0059178 | A1* | 3/2013 | Ihara | H01M 10/0525 429/61 |
| 2014/0227562 | A1* | 8/2014 | Kamizori | H01M 50/574 429/7 |
| 2014/0363726 | A1 | 12/2014 | Honda et al. | |
| 2016/0181618 | A1 | 6/2016 | Hoshiba | |
| 2017/0117533 | A1 | 4/2017 | Takaichi et al. | |
| 2018/0047962 | A1 | 2/2018 | Honda | |

FOREIGN PATENT DOCUMENTS

| | | | |
|---|---|---|---|
| CN | 106784549 | A | 5/2017 |
| CN | 107210414 | A | 9/2017 |
| JP | 2001-176482 | A | 6/2001 |
| JP | 2003-86162 | A | 3/2003 |
| JP | 2003-151638 | A | 5/2003 |
| JP | 2008-282735 | A | 11/2008 |
| JP | 2017-084769 | A | 5/2017 |
| WO | 2017/051514 | A1 | 3/2017 |

OTHER PUBLICATIONS

English translation of Office Action dated Dec. 20, 2023, issued in counterpart CN Application No. 201980020085.0. (4 pages).

Office Action dated Jul. 26, 2024, issued in counterpart CN application No. 201980020085.0, with Partial English translation. (8 pages).

Luo Qingsheng, et al., My Robot, Design and Fabrication of Miniature Bionic Robot (M), Beijing: Beijing Institute of Technology Press, 2016, p. 55-56; Cited in CN Office Action dated Jul. 26, 2024. (2 pages).

* cited by examiner

NONAQUEOUS ELECTROLYTE SECONDARY BATTERY AND METHOD FOR MANUFACTURING NONAQUEOUS ELECTROLYTE SECONDARY BATTERIES

TECHNICAL FIELD

The present disclosure relates to a nonaqueous electrolyte secondary battery and a method for manufacturing nonaqueous electrolyte secondary batteries.

BACKGROUND ART

A nonaqueous electrolyte secondary battery separator proposed in the conventional art has a separator substrate composed of a polyolefin microporous film, and porous layers which are disposed on the entirety of the front and reverse faces of the separator substrate and which are formed of an organic polymer that is swelled with an electrolytic solution and thereby holds the electrolytic solution (see PTL 1). PTL 1 describes that the separator has good adhesion with respect to electrodes, is excellent in handleability, and is suited for a laminated battery (a pouch battery).

CITATION LIST

Patent Literature

PTL 1: Japanese Published Unexamined Patent Application No. 2003-86162

SUMMARY OF INVENTION

Technical Problem

In cylindrical nonaqueous electrolyte secondary batteries in which an electrode assembly is accommodated in a metallic exterior case, the electrode assembly expands after repeated charging/discharging cycles and comes to receive a pressure from the exterior case. Such an action of pressure sometimes results in electrode plate deformation in which the electrode plates constituting the electrode assembly are bent. The occurrence of an electrode plate deformation can lead to internal short circuiting. In cylindrical nonaqueous electrolyte secondary batteries, it is an important challenge to suppress the occurrence of electrode plate deformation which can cause an internal short circuit.

Solution to Problem

A nonaqueous electrolyte secondary battery according to an aspect of the present disclosure is a cylindrical nonaqueous electrolyte secondary battery that includes a wound electrode assembly including a positive electrode having a positive electrode core and positive electrode mixture layers disposed on both faces of the positive electrode core, a negative electrode having a negative electrode core and negative electrode mixture layers disposed on both faces of the negative electrode core, and a separator interposed between the positive electrode and the negative electrode; and a nonaqueous electrolyte, wherein the separator is bonded to the positive electrode over a region from an end of the positive electrode mixture layer on a coiling start side to a length corresponding to at least one loop in a winding direction.

A method for manufacturing a nonaqueous electrolyte secondary battery according to an aspect of the present disclosure is a method for manufacturing a cylindrical nonaqueous electrolyte secondary battery that includes a wound electrode assembly including a positive electrode having a positive electrode core and positive electrode mixture layers disposed on both faces of the positive electrode core, a negative electrode having a negative electrode core and negative electrode mixture layers disposed on both faces of the negative electrode core, and a separator interposed between the positive electrode and the negative electrode; a nonaqueous electrolyte; and a battery case accommodating the electrode assembly and the nonaqueous electrolyte, wherein the method includes a step of bonding the separator and the positive electrode to each other, and the step is performed in such a manner that after the electrode assembly and the nonaqueous electrolyte are placed into the battery case, the case is heated to bond the separator to the positive electrode over a region from an end of the positive electrode mixture layer on a coiling start side to a length corresponding to at least one loop in a winding direction.

A method for manufacturing a nonaqueous electrolyte secondary battery according to another aspect of the present disclosure includes a first step of connecting an electrode lead to an end portion of the electrode assembly on a coiling start side, and a second step of bonding the separator and the positive electrode to each other, wherein the second step is performed in such a manner that after the electrode assembly and the nonaqueous electrolyte are placed into the battery case, an electrical current is discharged at not less than 20 A through the electrode lead to bond the separator to the positive electrode over a region from an end of the positive electrode mixture layer or the negative electrode mixture layer on a coiling start side to a length corresponding to at least one loop in a winding direction.

Advantageous Effects of Invention

The nonaqueous electrolyte secondary battery according to the present disclosure is resistant to the occurrence of electrode plate deformation which can cause an internal short circuit. Further, the nonaqueous electrolyte secondary battery attains good cycle characteristics by virtue of the suppression of electrode plate deformation which can give rise to a variation in interelectrode distance.

DESCRIPTION OF EMBODIMENTS

In cylindrical nonaqueous electrolyte secondary batteries having a wound electrode assembly, as mentioned earlier, it is an important challenge to suppress the occurrence of electrode plate deformation which can cause an internal short circuit. Further, electrode plate deformation leads to a decrease in cycle characteristics. The present inventors have found that the occurrence of electrode plate deformation is suppressed by bonding a positive electrode and a separator to each other over a region from the end of a positive electrode mixture layer on the coiling start side to a length corresponding to at least one loop in the winding direction. An end portion of an electrode assembly on the coiling start side is curved with a greater curvature and is adjacent to a space in the center of the coil. Thus, the stress generated by electrode expansion tends to be concentrated there to cause the occurrence of electrode plate deformation. In the nonaqueous electrolyte secondary battery according to the present disclosure, the positive electrode and the separator are bonded together in an end portion of the electrode assembly on the coiling start side, and the battery is prevented from electrode plate deformation probably because the electrode assembly attains an increased rigidity at least in the end portion thereof on the coiling start side.

Figure 1:
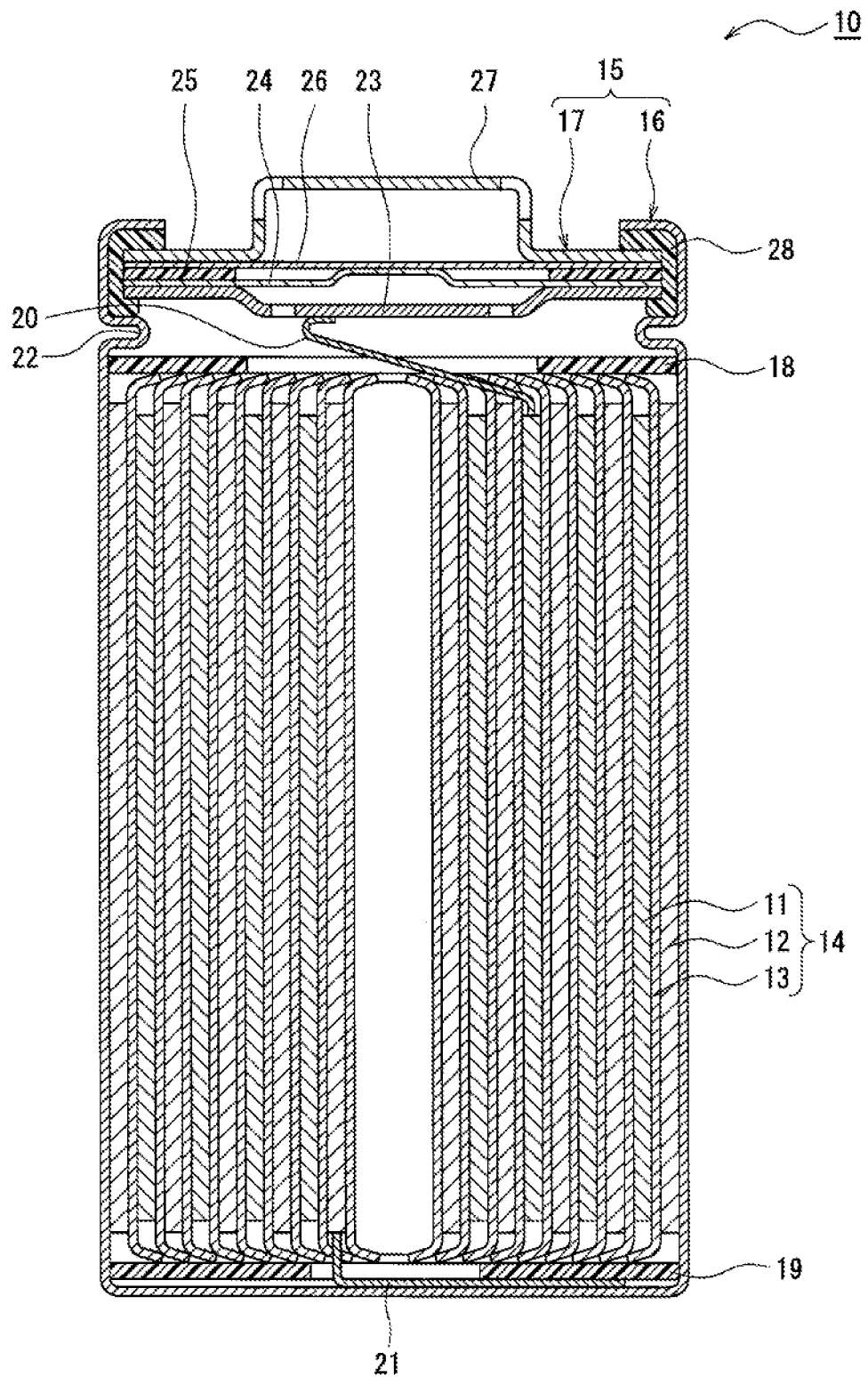
FIG. 1 is a vertical sectional view of a nonaqueous electrolyte secondary battery according to an example embodiment.
Figure 2:
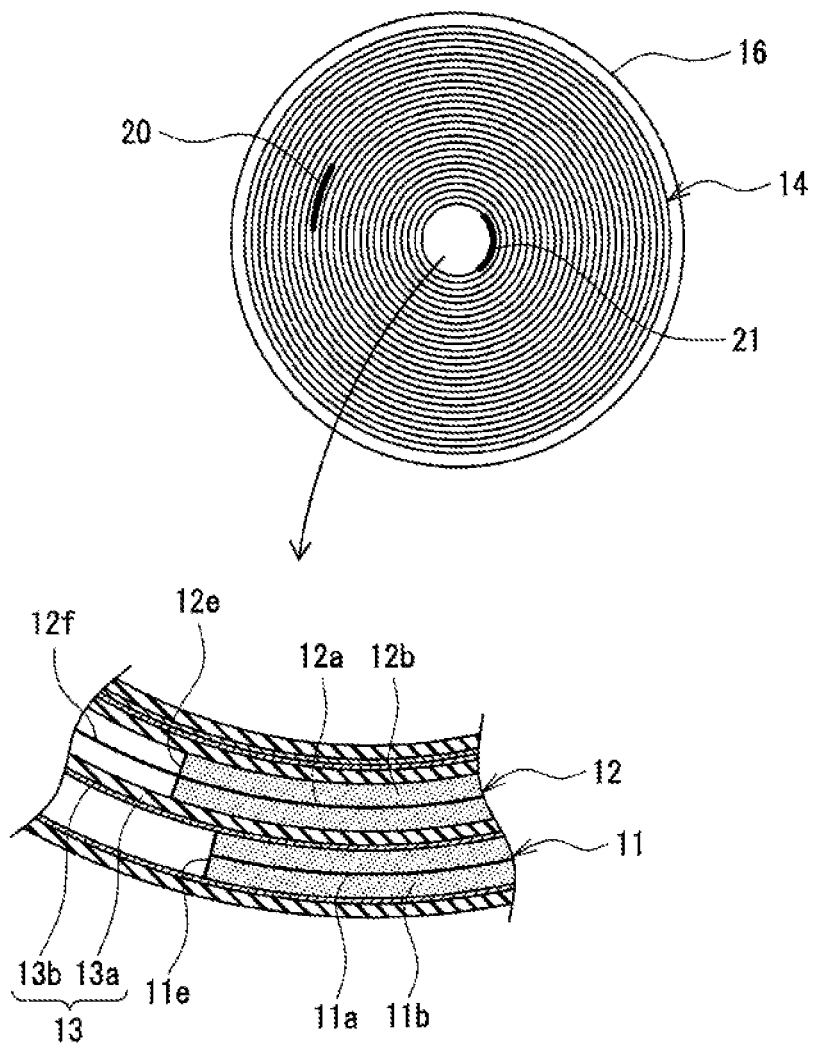
FIG. 2 is a horizontal sectional view of a nonaqueous electrolyte secondary battery according to an example embodiment.

Hereinbelow, an example embodiment of the nonaqueous electrolyte secondary batteries according to the present disclosure will be described in detail with reference to the drawings. FIG. 1 is a vertical sectional view of a nonaqueous electrolyte secondary battery 10 according to an example embodiment. FIG. 2 is a horizontal sectional view of the nonaqueous electrolyte secondary battery 10.

As illustrated in FIG. 1 and FIG. 2, the nonaqueous electrolyte secondary battery 10 includes a wound electrode assembly 14, a nonaqueous electrolyte (not shown), and a battery case 15 accommodating the electrode assembly 14 and the nonaqueous electrolyte. The electrode assembly 14 includes a positive electrode 11, a negative electrode 12, and a separator 13 interposed between the positive electrode 11 and the negative electrode 12, and has a wound structure in which the positive electrode 11 and the negative electrode 12 are wound together via the separator 13. The battery case 15 is composed of a bottomed cylindrical exterior case 16, and a sealing unit 17 that closes the opening of the exterior case 16. Further, the nonaqueous electrolyte secondary battery 10 includes a resin gasket 28 disposed between the exterior case 16 and the sealing unit 17.

The nonaqueous electrolyte includes a nonaqueous solvent and an electrolyte salt dissolved in the nonaqueous solvent. Examples of the nonaqueous solvents include esters, ethers, nitriles, amides, and mixtures of two or more kinds of these solvents. The nonaqueous solvent may include a halogenated solvent resulting from the substitution of the above solvent with a halogen atom such as fluorine in place of at least part of hydrogen. The nonaqueous electrolyte is not limited to a liquid electrolyte and may be a solid electrolyte using a gelled polymer or the like. The electrolyte salt may be a lithium salt such as $LiPF_6$.

The electrode assembly 14 has a long positive electrode 11, a long negative electrode 12, and two long sheets of separators 13. Further, the electrode assembly 14 has a positive electrode lead 20 coupled to the positive electrode 11, and a negative electrode lead 21 coupled to the negative electrode 12. To prevent the deposition of lithium, the negative electrode 12 is one size larger than the positive electrode 11 and is formed larger than the positive electrode 11 in the longer direction and the shorter direction (the vertical direction). The two sheets of separators 13 are one size larger than at least the positive electrode 11, and are arranged, for example, so as to interpose the positive electrode 11 therebetween.

While the negative electrode 12 may constitute the end of the electrode assembly 14 on the coiling start side, as illustrated in FIG. 2, the separator 13 generally extends beyond the end of the negative electrode 12 on the coiling start side. That is, the end of the separator 13 on the coiling start side defines the end of the electrode assembly 14 on the coiling start side.

In the present embodiment, an end 11e of a positive electrode mixture layer 11b on the coiling start side coincides with the end of the positive electrode 11 on the coiling start side. On the other hand, an end 12e of a negative electrode mixture layer 12b on the coiling start side does not coincide with the end of the negative electrode 12 on the coiling start side, and the negative electrode 12 has, at the end portion thereof on the coiling start side, an exposed portion 12f in which the surface of a negative electrode core 12a is exposed from the negative electrode mixture layers 12b. The negative electrode lead 21 is welded to the exposed portion 12f. The positive electrode 11 has, at the center thereof in the longitudinal direction, an exposed portion in which the surface of a positive electrode core 11a is exposed, and the positive electrode lead 20 is welded to this exposed portion. In an embodiment, the negative electrode 12 may have an exposed portion at an end portion thereof on the coiling finish side, and the negative electrode lead 21 may be connected to this exposed portion, or the exposed portion may abut on the inner surface of the exterior case 16 to establish an electrical connection between the negative electrode 12 and the exterior case 16.

Insulating plates 18 and 19 are disposed above and below the electrode assembly 14, respectively. In the example illustrated in FIG. 1, the positive electrode lead 20 attached to the positive electrode 11 extends toward the sealing unit 17 through a through-hole in the insulating plate 18, and the negative electrode lead 21 attached to the negative electrode 12 extends to the bottom of the exterior case 16 through a through-hole in the insulating plate 19. The positive electrode lead 20 is connected to the lower surface of a filter 23, which is the bottom plate of the sealing unit 17, by welding or the like. A cap 27, which is the top plate of the sealing unit 17, is electrically connected to the filter 23 and serves as a positive electrode terminal. The negative electrode lead 21 is connected to the inner surface of the bottom of the exterior case 16 by welding or the like, and the exterior case 16 serves as a negative electrode terminal.

The exterior case 16 is a bottomed cylindrical metal container. The gasket 28 is disposed between the exterior case 16 and the sealing unit 17 to seal tightly the space inside the battery case 15. The exterior case 16 has a groove portion 22 which is formed by, for example, pressing a lateral surface portion from the outside and which supports the sealing unit 17 thereon. The groove portion 22 is preferably disposed in an annular shape along the circumferential direction of the exterior case 16, and supports the sealing unit 17 on the upper surface thereof. An upper end portion of the exterior case 16 is bent inward along the peripheral edge of the sealing unit 17 to fix the sealing unit 17.

The sealing unit 17 has a structure in which the filter 23, a lower valve 24, an insulating member 25, an upper valve 26 and the cap 27 are stacked in this order from the electrode assembly 14 side. The members constituting the sealing unit 17 each have, for example, a disk shape or a ring shape, and the members except the insulating member 25 are electrically connected to one another. The lower valve 24 and the upper valve 26 are connected to each other at their central portions, and the insulating member 25 is interposed between peripheral portions of the valves. In the event where the inner pressure of the battery is increased, the lower valve 24 is deformed so as to push the upper valve 26 toward the cap 27 and ruptures to interrupt the current path between the lower valve 24 and the upper valve 26. If the inner pressure is further elevated, the upper valve 26 is ruptured and allows the gas to be discharged through the opening in the cap 27.

Hereinbelow, the elements constituting the electrode assembly 14 will be described in detail, with particular emphasis placed on the separator 13 and the manner of bonding of the separator 13 and at least one of the positive electrode 11 and the negative electrode 12.

[Positive Electrodes]

The positive electrode 11 has a positive electrode core 11a and a positive electrode mixture layer 11b disposed on the positive electrode core 11a. The positive electrode core 11a may be, for example, a foil of a metal that is stable at the potentials of the positive electrode 11, such as aluminum or aluminum alloy, or a film having such a metal as a skin layer. The positive electrode mixture layer 11b includes a positive electrode active material, a conductive agent such as acetylene black, and a binder such as polyvinylidene fluoride (PVdF), and is preferably provided on both faces of the positive electrode core 11a. The positive electrode 11 may be fabricated by applying a positive electrode mixture slurry including components such as a positive electrode active material, a conductive agent and a binder onto a positive electrode core 11a, drying the wet films, and compressing the coatings to form positive electrode mixture layers 11b on both faces of the positive electrode core 11a.

The positive electrode active material may be, for example, a lithium metal composite oxide. Examples of the metal elements contained in the lithium metal composite oxide include Ni, Co, Mn, Al, B, Mg, Ti, V, Cr, Fe, Cu, Zn, Ga, Sr, Zr, Nb, In, Sn, Ta and W. A preferred example of the lithium metal composite oxides is a lithium metal composite oxide containing at least one of Ni, Co and Mn. Specific examples include a lithium metal composite oxide containing Ni, Co and Mn, and a lithium metal composite oxide containing Ni, Co and Al. For example, inorganic particles such as tungsten oxide, aluminum oxide and lanthanoid-containing compounds may be attached to the surface of particles of the lithium metal composite oxide.

[Negative Electrodes]

The negative electrode 12 has a negative electrode core 12a and a negative electrode mixture layer 12b disposed on the negative electrode core 12a. The negative electrode core 12a may be, for example, a foil of a metal that is stable at the potentials of the negative electrode 12, such as copper or copper alloy, or a film having such a metal as a skin layer. The negative electrode mixture layer 12b includes a negative electrode active material and a binder such as styrene butadiene rubber (SBR), and is preferably provided on both faces of the negative electrode core 12a. The negative electrode 12 may be fabricated by applying a negative electrode mixture slurry including components such as a negative electrode active material and a binder onto a negative electrode core 12a, drying the wet films, and compressing the coatings to form negative electrode mixture layers 12b on both faces of the negative electrode core 12a.

The negative electrode mixture layers 12b preferably include, as the negative electrode active material, a graphite, for example, a natural graphite such as natural flake graphite, vein graphite or amorphous graphite, or an artificial graphite such as vein artificial graphite or graphitized mesophase carbon microbeads. The negative electrode mixture layers 12b may include a mixture of a graphite and other negative electrode active material. Examples of the negative electrode active materials other than graphites include metals alloyable with lithium such as Si and Sn, alloys containing such metals, and compounds containing such metals. In particular, silicon compounds containing Si are preferable.

The content of a silicon compound in the negative electrode mixture layer 12b is, for example, 1 to 15 mass % of the total mass of the negative electrode active materials, and preferably 5 to 10 mass %.

Examples of the silicon compounds include silicon oxides represented by $SiO_x$ ($0.5 \leq x \leq 1.6$). For example, silicon oxides represented by $SiO_x$ have a structure in which Si microparticles are dispersed in a $SiO_2$ matrix. Use may be made of silicon compounds $Li_{2y}SiO_{(2+y)}$ ($0<y<2$) having a structure in which Si microparticles are dispersed in a lithium silicate phase.

Preferably, a conductive coating is formed on the surface of particles of the silicon compound. For example, the conductive coating may be composed of at least one material selected from carbon materials, metals and metal compounds. In particular, carbon materials such as amorphous carbon are preferable. For example, a carbon coating may be formed by a CVD method using acetylene, methane or the like, or by mixing particles of the silicon compound with a carbon material such as coal pitch, petroleum pitch or phenolic resin and heat treating the mixture. Alternatively, a conductive coating may be formed by attaching a conductive filler such as carbon black onto the surface of particles of the silicon compound using a binder.

[Separators]

The separator 13 may be a porous sheet having ion permeability and insulating properties. The separator 13 is bonded to the positive electrode 11 over a region from the end 11e of the positive electrode mixture layer 11b on the coiling start side to a length corresponding to at least one loop in the winding direction. That is, the positive electrode 11 and the separator 13 are bonded together in the end portion of the electrode assembly 14 on the coiling start side, and the occurrence of electrode plate deformation is suppressed probably because the electrode assembly 14 attains an increased rigidity at the end portion thereof on the coiling start side where a stress tends to be concentrated by expansion of the electrode assembly 14.

The separator 13 may be a monolayer structure as long as having adhesion with respect to the electrodes, but is preferably composed of a porous resin substrate 13a and a surface layer 13b disposed on the substrate 13a. The surface layer 13b is a porous layer containing a resin that adheres to the electrodes, and serves as a bonding layer. Preferably, the surface layer 13b further contains inorganic particles. In this case, the surface layer 13b also functions as a heat resistant layer that enhances the heat resistance of the separator 13. The content of the inorganic particles is preferably 45 to 90 mass %, more preferably 50 to 85 mass %, and particularly preferably 55 to 80 mass % of the total mass of the surface layer 13b.

The porosity of the separator 13 is, for example, 30% to 70%. The porosity of the separator 13 is determined by the porosity of the substrate 13a. The void content of the separator 13 is measured by the following method.

(1) The separator 13 is punched into a circle with a diameter of 2 cm, and the central thickness h and mass w of the punched piece of the separator 13 are measured.

(2) From the thickness h and the mass w, the volume V and mass W of the piece are determined. The void content s is calculated from the following equation.

Void content $\varepsilon$ (%)=$((\rho V-W)/(\rho V))\times 100$ $\rho$: Density of the material constituting the separator 13.

The substrate 13a is composed of a porous sheet having ion permeability and insulating properties, for example, a microporous thin film, a woven fabric or a nonwoven fabric. The resin forming the substrate 13a is not particularly limited, but is preferably a polyolefin. Examples of the polyolefins include polyethylene, polypropylene, and copolymers of polyethylene and α-olefins. The substrate 13a may have a monolayer structure or a multilayer structure such as a polyethylene/polypropylene/polyethylene trilaminar structure. The thickness of the substrate 13a is not particularly limited, but is preferably 3 to 20 μm, and more preferably 5 to 15 μm.

The surface layer 13b may be formed on both faces of the substrate 13a, but is preferably formed on one face of the substrate 13a from points of view such as productivity. In the example illustrated in FIG. 2, the surface layer 13b is disposed on the face of the substrate 13a opposed to the positive electrode 11. For example, the surface layer 13b is formed over substantially the entirety of one face of the substrate 13a. The separator 13 is preferably arranged between the positive electrode 11 and the negative electrode 12 so that the surface layer 13b is opposed to the positive electrode 11. The thickness of the surface layer 13b is not particularly limited, but is preferably smaller than the thickness of the substrate 13a and is, for example, 0.5 to 5 μm.

As already described, the separator 13 is bonded to at least one of the positive electrode 11 and the negative electrode 12 in the end portion of the electrode assembly 14 on the coiling start side. In the example illustrated in FIG. 2, the surface layer 13b that is a bonding layer is provided on the face of the substrate 13a opposed to the positive electrode 11, and the separator 13 is bonded only to the positive electrode 11. Because two sheets of separators 13 are provided so as to interpose the positive electrode 11 therebetween, the separators 13 are bonded to both faces of the positive electrode 11. The portions of the separators 13 extending beyond the end lie of the positive electrode mixture layer 11b on the coiling start side may be bonded to each other. The separator 13 may be bonded to only one face of the positive electrode 11.

The separator 13 may be bonded over the entire length of the positive electrode 11, or may be bonded over a region from the end lie of the positive electrode mixture layer 11b on the coiling start side to a length corresponding to one loop in the winding direction, that is, only to the innermost loop portion of the positive electrode 11. The occurrence of electrode plate deformation can be effectively suppressed when the separator 13 is bonded at least to the innermost loop portion of the positive electrode 11. Preferably, the separator 13 is bonded to an end portion of the positive electrode 11 on the coiling start side including the innermost loop portion, specifically, over a region from the end 11e of the positive electrode mixture layer 11b on the coiling start side to a length corresponding to 10% of the length of the positive electrode 11. For example, the separator 13 is bonded to substantially the entire surface of the end portion of the positive electrode 11 on the coiling start side. The separator 13 may be bonded to both the positive electrode 11 and the negative electrode 12, but is preferably bonded to the positive electrode 11 alone.

The resin that forms the surface layer 13b preferably includes at least either of a mixed resin including polyvinylidene fluoride (PVdF) and hexafluoropropylene (HEP), or a copolymer of polyvinylidene fluoride and hexafluoropropylene (a PVdF-HEP copolymer). For example, the resin component in the surface layer 13b is composed solely of a mixed resin including PVdF and HEP, or a PVdF-HEP copolymer. Such a resin absorbs an electrolytic solution and is swelled therewith, and comes to exhibit adhesion to the electrodes when heated.

The inorganic particles contained in the surface layer 13b are composed of an insulating inorganic compound that will not be melted or decomposed when the battery generates abnormal heat. Some examples of the inorganic particles are particles of metal oxides, metal oxide hydrates, metal hydroxides, metal nitrides, metal carbides and metal sulfates. The average particle size of the inorganic particles is, for example, 0.2 to 2 μm.

Examples of the metal oxides and the metal oxide hydrates include aluminum oxide (alumina), boehmite ($Al_2O_3H_2O$ or AlOOH), magnesium oxide, titanium oxide, zirconium oxide, silicon oxide, yttrium oxide and zinc oxide. Examples of the metal nitrides include silicon nitride, aluminum nitride, boron nitride and titanium nitride. Examples of the metal carbides include silicon carbide and boron carbide. Examples of the sulfates include barium sulfate. Examples of the metal hydroxides include aluminum hydroxide.

Further, the inorganic particles may be particles of a porous aluminosilicate salt such as zeolite ($M_{2/n}O \cdot Al_2O_3 \cdot xSiO_2 \cdot yH_2O$ wherein M denotes a metal element, $x \geq 2$, and $y \geq 0$), a layered silicate salt such as talc ($Mg_3Si_4O_{10}(OH)_2$), barium titanate, strontium titanate or the like. In particular, at least one selected from alumina, boehmite, talc, titanium oxide and magnesium oxide is preferable from points of view such as insulating properties and heat resistance.

The surface layer 13b may be formed by applying a solution of the resins for forming the surface layer 13b such as PVdF and HEP, to the surface of a substrate 13a. A surface layer 13b containing inorganic particles may be formed by adding inorganic particles to the resin solution. Examples of the methods for applying the resin solution (the methods for forming a film) include die extrusion, bar coating and dipping. After the resin solution is applied to the surface of the substrate 13a, the coating may be dried to remove the solvent, or the substrate 13a may be immersed in a coagulation bath to remove the solvent. The coagulation bath may include a mixture of a solvent that is the same as the solvent used in the resin solution, and a solvent such as water that is inert and compatible with the above solvent.

The steps for manufacturing the nonaqueous electrolyte secondary battery 10 include a step of bonding the separator 13 and the positive electrode 11 to each other. In this step, the separator 13 is bonded to the positive electrode 11 over a region from the end 11e of the positive electrode mixture layer 11b on the coiling start side to a length corresponding to at least one loop in the winding direction, by the heat treatment or the discharge treatment described later. When the separator 13 is heated utilizing heat generated by discharging, it is preferable that an electrode lead be connected to an end portion of the electrode assembly 14 on the coiling start side. For example, the negative electrode lead 21 is connected to the portion of the core exposed at the end portion of the negative electrode 12 on the coiling start side.

For example, the separator 13 may be bonded to the positive electrode 11 in such a manner that after the electrode assembly 14 and the nonaqueous electrolyte (the electrolytic solution) are placed into the battery case 15, the battery case 15 is heated. The cylindrical battery having the cylindrical electrode assembly 14 cannot be heated using a hot press or a similar device, and therefore good adhesion with respect to the positive electrode 11 is ensured by, for example, performing heating after the resins forming the surface layer 13b have been swollen with the electrolytic solution. In the case where the separator 13 has the surface layer 13b on the entire surface of the substrate 13a and the whole of the battery case 15 is heated, for example, the separator 13 is bonded to substantially the entire surface of the positive electrode 11.

The heating temperature is preferably 80 to 90° C. If the heating temperature is below 80° C., the resins are not sufficiently swollen with the liquid and the bond strength tends to be lowered. If, on the other hand, the heating temperature is too high, the electrolytic solution may be denatured. To prevent the decomposition of the electrolytic solution, it is preferable that the heat treatment be performed at a state of charge of 20% or less before initial charging and discharging.

The discharge treatment is performed in such a manner that after the electrode assembly 14 and the nonaqueous electrolyte are placed into the battery case 15, an electrical current is discharged at not less than 20 A through the electrode lead (the negative electrode lead 21) connected to the end portion of the electrode assembly 14 on the coiling start side. The heat generated in this treatment causes the surface layer 13b of the separator 13 to develop adhesion. A nickel lead suitable as the negative electrode lead 21 has a high specific resistance and generates a large amount of Joule heat when a current is discharged therethrough at a high rate of 20 A or more, thus heating the vicinity of the lead. Because the region heated by the discharging is limited to an end portion of the electrode assembly 14 on the coiling start side, the separator 13 is bonded only to the end portion of the positive electrode 11 on the coiling start side even when, for example, the separator 13 has the surface layer 13b on the entire surface of the substrate 13a.

EXAMPLES

Hereinbelow, the present disclosure will be further described based on EXAMPLES. However, it should be construed that the scope of the present disclosure is not limited to such EXAMPLES.

Example 1

[Fabrication of Positive Electrode]

A positive electrode mixture slurry was prepared by mixing 100 parts by mass of $LiNi_{0.88}Co_{0.09}Al_{0.03}O_2$, 1 part by mass of acetylene black, and 0.9 parts by mass of polyvinylidene fluoride, and adding an appropriate amount of N-methyl-2-pyrrolidone (NMP). Next, the positive electrode mixture slurry was applied to both faces of a long positive electrode core made of a 15 μm thick aluminum foil, and the wet films were dried. The dried coatings were compressed using a roller, and the unit was cut into a predetermined electrode size. A positive electrode (thickness: 0.144 mm, width: 62.6 mm, length: 861 mm) was thus fabricated which had positive electrode mixture layers on both faces of the positive electrode core. A portion of the core located at the center of the positive electrode in the longitudinal direction was left exposed from the mixture layers, and a positive electrode lead made of aluminum was welded to the surface of this exposed portion.

[Fabrication of Negative Electrode]

A negative electrode mixture slurry was prepared by mixing 95 parts by mass of a graphite powder, 5 parts by mass of Si oxide, 1 part by mass of sodium carboxymethylcellulose and 1 part by mass of styrene-butadiene rubber as a dispersion, and adding an appropriate amount of water.

Next, the negative electrode mixture slurry was applied to both faces of a long negative electrode core made of an 8 μm thick copper foil, and the wet films were dried. The dried coatings were compressed using a roller, and the unit was cut into a predetermined electrode size. A negative electrode (thickness: 0.160 mm, width: 64.2 mm, length: 959 mm) was thus fabricated which had negative electrode mixture layers on both faces of the negative electrode core. A portion of the core located at an end of the negative electrode in the longitudinal direction (at an end that would define the coiling start side of an electrode assembly) was left exposed from the mixture layers, and a negative electrode lead made of nickel was welded to the surface of this exposed portion.

[Fabrication of Separator]

100 Parts by mass of polyvinylidene fluoride-hexafluoropropylene copolymer and 200 parts by mass of alumina (AKP3000 manufactured by Sumitomo Chemical Co., Ltd.) were added to NMP to give an alumina-dispersed resin solution for forming a surface layer. The solubility of the copolymer in NMP was 4 mass %. Next, the resin solution was applied to one face of a 10 μm thick porous polyethylene substrate. The substrate was then immersed in ion-exchange water to remove the solvent. Thereafter, the film was washed with running ion-exchange water and was dried. A separator was thus obtained which had a surface layer on one face of the substrate.

[Fabrication of Electrode Assembly]

A wound electrode assembly was fabricated by coiling the positive electrode and the negative electrode together via the separator. In this process, the coil was fabricated in such a manner that the surface layer of the separator would be opposed to the positive electrode.

[Preparation of Nonaqueous Electrolytic Solution]

Ethylene carbonate (EC) and dimethyl carbonate (DMC) were mixed together in a volume ratio of EC:DMC=3:7. To the mixed solvent, 5 mass % vinylene carbonate was added. $LiPF_6$ was dissolved with a concentration of 1.5 mol/L. A nonaqueous electrolytic solution was thus prepared.

[Fabrication of Battery]

Insulating plates were arranged on and under the electrode assembly. The negative electrode lead was welded to a battery case, and the positive electrode lead was welded to a sealing unit. The electrode assembly was then placed into the exterior case. Next, the nonaqueous electrolytic solution was poured into the exterior case, and the battery case was sealed by crimping the open end of the exterior case to fix the sealing unit via a gasket. Thereafter, the unit was allowed to stand in a thermostatic chamber at 80° C. for 15 hours. By this heating step, a nonaqueous electrolyte secondary battery was obtained in which the separator was bonded to substantially the entire surface of the positive electrode. The battery capacity was 4600 mAh.

Example 2

A battery was fabricated in the same manner as in EXAMPLE 1, except that the unit was allowed to stand in a thermostatic chamber at 80° C. for 6 hours.

Example 3

A battery was fabricated in the same manner as in EXAMPLE 1, except that the static heating step in a thermostatic chamber at 80° C. was replaced by the discharge treatment described below, and consequently the separator was bonded to the positive electrode over a region from the end of the positive electrode mixture layer on the coiling start side to a length corresponding to about 10% of the length of the positive electrode.

Discharge treatment: At an environment temperature of 25° C., the battery was charged at a constant current of 1380 mA (0.3 It) to a battery voltage of 4.2 V and charged at the constant voltage to a cutoff current of 92 mA. After a rest of 20 minutes, the battery was discharged to 2.5 V at a constant discharge current of 20 A.

Comparative Example 1

A battery was fabricated in the same manner as in EXAMPLE 1, except that the static heating step in a thermostatic chamber at 80° C. was cancelled.

The batteries of EXAMPLES and COMPARATIVE EXAMPLE were tested by the methods described below to evaluate the bond strength between the positive electrode mixture layer and the separator, cycle characteristics, and electrode plate deformation. The evaluation results are described in Table 1.

[Measurement of Bond Strength Between Positive Electrode and Separator]

The battery was disassembled without separating the positive electrode and the separator. Thus, the positive electrode and the separator bonded together were recovered as a sample. A test piece 2 cm in length and 5 cm in width was cut from an end portion of the sample on the coiling start side of the positive electrode, and was subjected to a 90° peel test (stress rate: 20 mm/min) with a universal testing machine to determine the bond strength between the positive electrode mixture layer and the separator. The state of bonding and the range of bonding were examined by appearance evaluation.

[Evaluation of Cycle Characteristics (Capacity Retention Ratio after 500 Cycles)]

At an environment temperature of 25° C., the batteries of EXAMPLES and COMPARATIVE EXAMPLE were each charged at a constant current of 1380 mA (0.3 It) to a battery voltage of 4.2 V and charged at the constant voltage to a cutoff current of 92 mA, and were thereafter each discharged at a constant current of 4600 mA (1 It) to a battery voltage of 2.7 V. The charging and the discharging were each followed by a rest of 20 minutes. This charging/discharging cycle was repeated 500 times, and the ratio of the discharge capacity after 500 cycles to the initial discharge capacity was calculated as the capacity retention ratio.

[Evaluation of Electrode Plate Deformation (See FIG. 3)]

Figure 3:
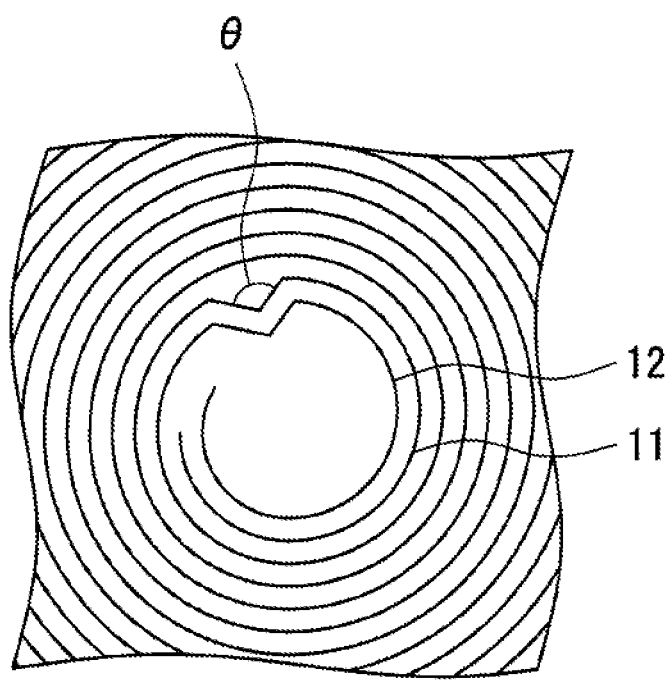
FIG. 3 is a view illustrating how electrode plate deformation is evaluated.

The batteries after the cycle test were each charged at a constant current of 1380 mA (0.3 It) to a battery voltage of 4.2 V and charged at the constant voltage to a cutoff current of 92 mA. Thereafter, a cross section near the center of the coil of the electrode assembly was observed using an X-ray CT apparatus (SMX-225CT FPD HR manufactured by Shimadzu Corporation). The batteries were evaluated as having an electrode plate deformation when, as illustrated in FIG. 3, the electrode plate (at least one of the positive electrode and the negative electrode) had been deformed (bent) at an angle θ of 150° or less. The electrode plate deformation was evaluated based on the following criteria. The evaluation results are described in Table 1.

○: There was no electrode plate deformation.

Δ: Electrode plate deformation was found in one layer.

x: Electrode plate deformation was found in two or more layers.

TABLE 1

| | Separator | Range of bonding with positive electrode | Bond strength | Bonding process | Electrode plate deformation | Capacity retention ratio |
|---|---|---|---|---|---|---|
| COMP. EX. 1 | Surface layer absent | — | — | — | x | 60% |
| EX. 1 | Surface layer present | Entire surface | 12 N/m | Heating at 80° C. for 15 h | ○ | 73% |
| EX. 2 | Surface layer present | Entire surface | 9 N/m | Heating at 80° C. for 6 h | ○ | 70% |
| EX. 3 | Surface layer present | 10% on coiling start side | 11 N/m | Discharge treatment at 20 A | ○ | 74% |

As described in Table 1, the batteries of EXAMPLES were resistant to electrode plate deformation compared to the battery of COMPARATIVE EXAMPLE. In the batteries of EXAMPLES, the positive electrode and the separator were bonded to each other at least in the end portion of the electrode assembly on the coiling start side, and the occurrence of electrode plate deformation was suppressed probably because the electrode assembly attained an increased rigidity at the end portion thereof on the coiling start side where a stress would be concentrated by expansion of the electrodes. Further, the cycle characteristics of the batteries were significantly improved by virtue of the suppression of electrode plate deformation.

REFERENCE SIGNS LIST

10 NONAQUEOUS ELECTROLYTE SECONDARY BATTERY, 11 POSITIVE ELECTRODE, 11a POSITIVE ELECTRODE CORE, 11b POSITIVE ELECTRODE MIXTURE LAYER, 12 NEGATIVE ELECTRODE, 12a NEGATIVE ELECTRODE CORE, 12b NEGATIVE ELECTRODE MIXTURE LAYER, 13 SEPARATOR, 13a SUBSTRATE, 13b SURFACE LAYER, 14 ELECTRODE ASSEMBLY, 15 BATTERY CASE, 16 EXTERIOR CASE, 17 SEALING UNIT, 18, 19 INSULATING PLATES, 20 POSITIVE ELECTRODE LEAD, 21 NEGATIVE ELECTRODE LEAD, 22 GROOVE PORTION, 23 FILTER, 24 LOWER VALVE, 25 INSULATING MEMBER, 26 UPPER VALVE, 27 CAP, 28 GASKET

The invention claimed is:

1. A method for manufacturing a cylindrical nonaqueous electrolyte secondary battery comprising a wound electrode assembly including a positive electrode having a positive electrode core and positive electrode mixture layers disposed on both faces of the positive electrode core, a negative electrode having a negative electrode core and negative electrode mixture layers disposed on both faces of the negative electrode core, and a separator interposed between the positive electrode and the negative electrode; a nonaqueous electrolyte; and a battery case accommodating the electrode assembly and the nonaqueous electrolyte, wherein the method comprises:

a step of connecting an electrode lead to an end portion of the electrode assembly on a coiling start side, a placement step of placing the electrode assembly and the nonaqueous electrolyte into the battery case, the electrode assembly including the separator comprising a resin layer in a non-adhesive state with respect to the positive electrode in the placement step, and after the placement step, a step of heating the resin layer by discharging an electrical current at not less than 20 A through the electrode lead, wherein said heating causes the resin layer to exhibit adhesion to the positive electrode, so as to bond the separator to the positive electrode over a region from an end of the positive electrode mixture layer on a coiling start side to a length corresponding to at least one loop in a winding direction.

* * * * *